Nov. 19, 1963   E. L. GROFF   3,111,264
RAIL JOINT
Filed Jan. 26, 1962
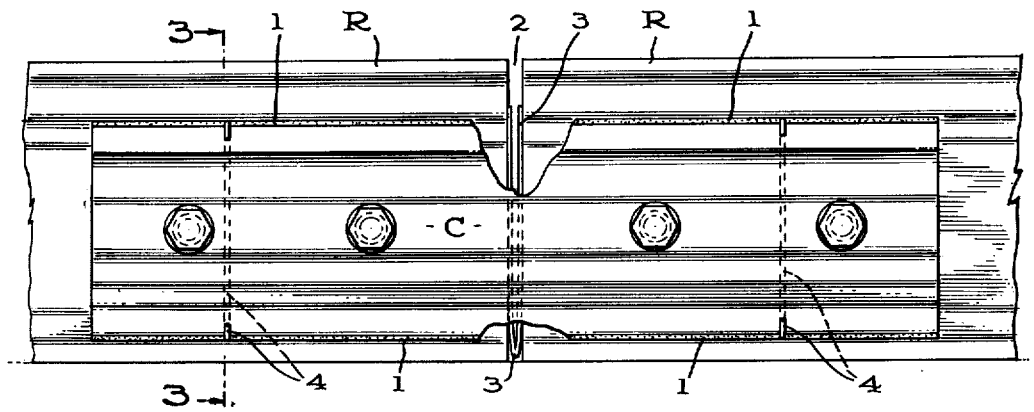
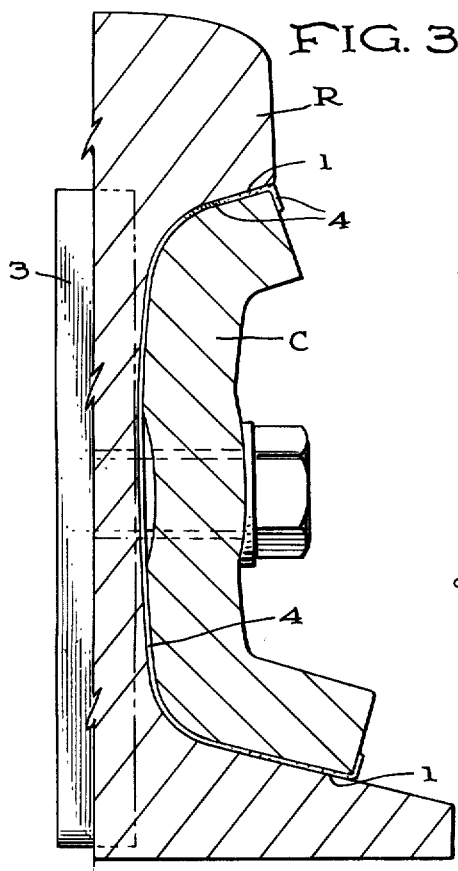
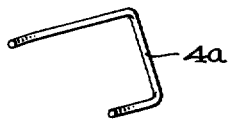
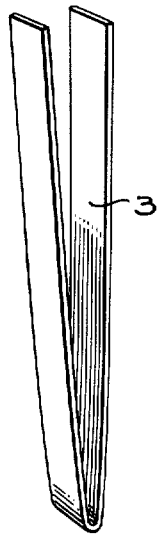
INVENTOR.

United States Patent Office 3,111,264
Patented Nov. 19, 1963

3,111,264
RAIL JOINT
Emory L. Groff, Bethesda, Md., assignor to Poor & Company, Chicago, Ill., a corporation of Delaware
Filed Jan. 26, 1962, Ser. No. 168,985
1 Claim. (Cl. 238—14.5)

This invention relates to rail joints to form continuous track, that is track wherein the rails are bonded together with a non-metallic material into strings of greater length than the rail as originally rolled.

Rail ends are currently welded together by an electrically formed arc or by the use of splice members bonded in the fishing area of the rail ends by an adhesive having thermosetting properties. Whether the rails are welded or bonded, the object is to eliminate movement between the abutting rail ends, even though in the case of bonded rail, the splice member is retained as a part of the connection.

The patent to Lansing, 2,989,240, dated June 20, 1961, discloses an insulated rail joint wherein the joint bars are bonded to the rail by a non-metallic thermosetting resin and the end post is also formed of a thermosetting resin. A joint of this type is used at the beginning and at the end of rails forming a signal block section in the track. Thus, this patent contemplates a complete insulated joint per se wherein the rails between such joints are electrically welded or secured together by joint bars making metal to metal contact with the rails.

Where, instead of welding, the rail ends are connected by splice bars or other connectors utilizing thermosetting adhesives, such as resins, or elastomeric materials having insulating properties, the desired conductivity of rails between rull insulated joints is destroyed. In other words, when rail ends are joined by bolted connectors, such as fish plates or the like, through the use of non-conductive adhesives, the rails so connected are such poor conductors that they become useless to carry signal track circuits between fully insulated joint locations. The bolts which clamp the fish plates or joint bars to the rails do not engage the sides of the holes in the web of the rail at any time, either when initially installed or subsequently in use, because the bolt holes are of greater diameter than the bolts.

Accordingly, an object of the present invention is to provide a rail end connector such as a fish plate, joint bar or the like, secured to the rail ends by a thermosetting resin, with a positive conductor piercing the layer of resin to make direct contact between the connectors and the rails which will insure continuity of the track circuits in the rails between insulated joints.

A further object of the invention is to provide simple and practical means for insuring electrical conducitvity of the rails, regardless of the type of connector, while not interfering with their installation, and which will be reliable and efficient in operation.

With the above and other objects in view which will more readily appear as the nature of the invention is better understood, the invention consists in the novel construction, combination, and arrangement of parts, hereinafter more fully described, illustrated, and claimed.

A preferred and practical embodiment of the invention is shown in the accompanying drawings, in which:

FIGURE 1 is a side elevation, partly in section, showing a splice member connecting the rail ends through a load bearing bonding adhesive, with a metallic conductor between the rail ends.

FIGURE 2 is a perspective view of the electrical conductor which may be placed between the rail ends of FIGURE 1.

FIGURE 3 is a half-vertical section of a rail end with a connector for bonding the rail ends together and showing a modified form of conductor.

FIGURE 4 is another modified form of coductor.

Referring to the drawings, the opposite rail ends are identified as R and R' respectively, the same bonded together by a suitable connector C through the use of a thermosetting resin 1, for example, a resin of the epoxy type. The space 2 between the abutting rail ends is made electrically conductive by use of the winged substantially V-shaped spring metal conductor 3 which may be driven into the space between the rail ends to make them electrically conductive through the ends, regardless of the fact that the bonding element 1 is a resin having insulating properties.

FIGURE 3 of the drawings also shows a conductive metallic spring wire clip 4 having end portions 5 which clamp over and grip the splice member at the time it is installed in the fishing space of the rail. This connector becomes imbedded in the thermosetting resin, but when the joint bars are pulled up tight between bolts, the conductor 4 insures positive metal to metal electrical contact between the bars and the rail ends.

While the wire type conductor 4 of FIGURE 3 may be in one piece for the sake of simplicity, it could be made in top and bottom sections 4ᵃ as shown in FIGURE 4 for engaging the head and base of the rail, while at the same time obtaining the same results.

It will of course be understood that the conductors 3 and 4 may be used together, as shown, but it is entirely within the scope of the invention to omit one or the other. In other words, they may be used separately.

By way of further illustrating the range of the invention, reference may be made to FIGURE 5 which shows a perforated button or wafer 6 of metal which may be inserted between the head of the bar and the foot of the bar so that when the bonding resin is applied and the bolts are tightened, the wafers will make electrical metal to metal contact.

In addition to the above, fillers such as conductive powdered particles, for example iron fillings resulting from sawing steel bars, may be admixed with the adhesive, even though other inert fillers are used, and applied to the load bearing areas of the bars.

I claim:

A bolted and bonded rail joint for making continuous rail electrically conductive, wherein the joint bars and rail ends bend with the same wave motion curve under rolling loads, comprising, in combination, adjacent rail ends, metallic adhesive having electrical insulation properties applied while fluent to the contacting surfaces of the rail ends and bars for bonding together the contacting metallic surfaces of the splice bars and the adjacent load bearing surfaces of the rail ends to reduce relative movement between the splice bars and rail ends and a conductive metallic member imbedded in the fluent bonding material at the time of application, whereby, when the bolts are tightened the bars press the said conductive metallic member through said fluent material and into direct conductive contact with the rail ends and splice bars where it remains when the thermo-setting material becomes hardened to assure permanent conductivity between the rail ends and splice bars.

References Cited in the file of this patent

UNITED STATES PATENTS

| | | |
|---|---|---|
| 874,085 | Karns | Dec. 17, 1907 |
| 941,332 | McAfee | Nov. 23, 1909 |
| 979,860 | Huse et al. | Dec. 27, 1910 |
| 2,589,876 | Sesher | Mar. 18, 1952 |
| 2,989,240 | Lansing | June 20, 1961 |

UNITED STATES PATENT OFFICE

CERTIFICATE OF CORRECTION

Patent No. 3,111,264                        November 19, 1963

Emory L. Groff

It is hereby certified that error appears in the above numbered patent requiring correction and that the said Letters Patent should read as corrected below.

Column 2, line 11, for "coductor." read -- conductor. FIG. 5 shows a still further modified form of conductor. --; lines 56 and 57, after "metallic" insert -- splice bars, a layer of thermosetting non-metallic --.

Signed and sealed this 27th day of October 1964.

(SEAL)
Attest:

ERNEST W. SWIDER
Attesting Officer

EDWARD J. BRENNER
Commissioner of Patents